Patented May 5, 1942

2,282,091

UNITED STATES PATENT OFFICE 2,282,091

PROCESS FOR PREPARING CALCINED GYPSUM

Oliver F. Redd, Wellsville, Ohio

No Drawing. Application October 17, 1938, Serial No. 235,505

3 Claims. (Cl. 23—122)

This invention relates to a process for preparing calcined gypsum, and is a continuation in part of my application, Serial No. 98,097, filed August 26, 1936.

Plaster of Paris, or calcined gypsum, is usually prepared from natural gypsum deposits (calcium sulphate deposits) of varying composition. The calcium sulphate is contaminated with various materials, such as carbonates and other salts, and the natural anhydrite of calcium sulphate. The object of my process is to prepare these impure deposits for use in wall plaster, gypsum tile, wall board, potter's molds, and other uses where high plasticity, high cohesive or tensile strength, hardness, smooth surface texture, and light color are desirable.

A highly plastic stucco is desirable for many reasons. First, it may be applied to walls with less effort than is required for less plastic materials. Second, it may be used in the top coat, of wall plaster, without the addition of lime, which is not available near some gypsum deposits and is, therefore, relatively expensive because of transportation cost. Third, it increases the amount of sand that may be used in the rough coat which results in economy of application. Fourth, it provides better adhesion and keying to the supporting laths.

The usual process of preparing plaster of Paris from gypsum consists of various grinding operations and calcination of the dihydrate to form the hemihydrate in accordance with the reaction

$$CaSO_4.2H_2O \rightarrow CaSO_4.\tfrac{1}{2}H_2O + 1\tfrac{1}{2}H_2O$$

The first operation, after removing the gypsum from the deposit, is to crush it to a convenient size for conveying, usually two inches. The second operation, which is occasionally omitted, is to grind the gypsum for further reduction of particle size. The gypsum is then calcined in kettles vented to a stack, or in rotary calciners. After calcination the plaster is stored, for a short period of time, in a hot pit, followed by regrinding for further reduction of size, after which it is mixed with retarder, hair, lime or other plasticizing materials, etc.

Calcium sulphate will form crystals containing various amounts of water such as the dihydrate $CaSO_4.2H_2O$, the hemi-hydrate

$$CaSO_4.\tfrac{1}{2}H_2O$$

and the anhydrite $CaSO_4$. The anhydrite may occur in either of two forms, the insoluble anhydrite that will not recrystallize to form a hydrated crystal when mixed with water, and the soluble anhydrite which reacts with water to form a hydrated crystal.

Kettles and rotary calciners do not produce uniform calcination of the calcium sulphate. The insoluble anhydrite, which occurs in the gypsum deposit, is not changed by the calcination process, but remains in the plaster as an inert filler, causing low tensile strength and low plasticity. The kettles are provided with mechanical agitators which do not provide sufficient agitation for the maintenance of uniform temperature. This results in localized overheating which causes part of the dihydrate to be calcined to the soluble anhydrite while other parts are not being converted, although an analysis will show the mixture to have an average formula of $CaSO_4.\tfrac{1}{2}H_2O$. The soluble anhydrite rapidly regains its water of crystallization to form the dihydrate. This water may be obtained from the atmosphere with the result that the plaster deteriorates before use. The dihydrate formed from the soluble anhydrite, together with the dihydrate resulting from incomplete calcination, lowers both tensile strength and plasticity. Theoretically, it should be possible to provide calcining kettles with sufficient agitation to prevent localized overheating, however, the cost of such agitation appears to be prohibitive. It is true that the evolution of steam, during calcination, produces agitation, but the evolution of steam subsides in the final stages of the calcination process when temperature is highest, and danger of overheating is greatest.

Rotary calciners provide agitation by tumbling the material. Their maximum allowable speed is that at which the centrifugal force acting on the gypsum, just causes part of it to travel in a circular path and remain continuously in contact with the shell. Maximum agitation is obtained at a considerably lower speed. The maximum agitation obtainable in rotary calciners also appears to be inadequate.

If perfect agitation were provided it would not produce the highest plasticity or tensile strength. The formation of the soluble anhydrite might possibly be prevented, but the insoluble anhydrite would not be converted because its presence and conversion is not dependent on agitation.

Because of the low plasticity obtained by the calcination methods previously described, it is customary to regrind the calcined gypsum in a tube mill. This operation is described in Letters Patent 1,392,574, granted to Warren E. Emely, October 4, 1921, and Letters Patent 1,457,161, granted to Robert E. Haire, May 29, 1931. Essential features of this invention is the grinding with the "exclusion of air in circulation through said mill" and "discharge at the periphery of of the mill." The peripheral discharge permits the carrying of a low gypsum charge in the mill and increases the grinding rate. Therefore, it is reasonable to assume, from the description of the process in Letters Patent 1,457,161, that the greatest benefit is obtained from the grinding action and not from contact with the water vapor in the tube mill. As no provision is made for closing the discharge grating, no vapor pressure will be developed in the mill. The mill appears to be warmed only by the heat produced in grinding. My process consists of an improvement of this method by applying temperature control, control of the vapor pressure within the mill and better removal of the air which may be carried into the mill entrapped in the interstices of the feed.

When grinding plaster by the method described in Letters Patent 1,392,547 and 1,457,161 a plasticity of two hundred and fifty (250) was obtained occasionally. With the same expenditure of grinding energy per ton of plaster, using gypsum from the same deposit, my process produced a plasticity of three hundred and eighty (380).

Other processes for preparing calcined gypsum depend on the conversion of the insoluble anhydrite into one of the hydrated forms. Two processes, that described in Letters Patent 1,898,636 granted to Harry K. Linzell, Feb. 21, 1933, and Letters Patent 1,931,240 granted to Wilbur S. Randel and Manvel C. Dailey, Oct. 17, 1933, depend on the grinding of a hot gypsum slurry in a ball mill. As the mill combines good agitation and the exposure of new surface to the water the chemical reaction should proceed rapidly. These processes have one disadvantage, that is, the product is a slurry and must be used near the place of calcination.

Processes of producing dry calcined gypsum of high strength consist of heating the gypsum, in a closed vessel, while maintaining it in contact with water or steam under high pressure. These processes are shown in Letters Patent 1,931,240 granted to Wilbur S. Randel and Manvel C. Daily, October 17, 1933, and Letters Patent 1,979,704, granted to Wilbur S. Randel, Manvel C. Daily, and William M. McNeil, November 6, 1934. These processes produce a calcined plaster in essentially the same form as the uncalcined gypsum which was charged into the calciner. My process produces a plaster having the high strength produced by this process, and in addition produces a soft fluffy powder requiring more water to reduce it to pouring consistency and higher plasticity.

A process of calcination, described in Letters Patent 1,984,201, granted to William B. Senseman, Dec. 11, 1934, provides for simultaneously grinding and calcining. The products of combustion pass first around the tube mill, then through the grinding compartment and to a dust collector, the gypsum being calcined either in the mill or in the conveying system. The hot gases have low relative humidity, and being in direct contact with the gypsum, are able to produce the soluble anhydrite. Furthermore, the low relative humidity of the gases in the mill provides an atmosphere which prevents the hydration of the insoluble anhydrite. In my process I obtain a beneficial effect by preventing, as much as possible, the inclusion of air or any gas, other than water vapor, in the grinding compartment.

When making plaster from uncalcined gypsum, I prefer to use a ball mill provided with a steam jacket and an opening through one trunnion through which steam may be admitted or steam and air may be removed. In carrying out the process, the mill is charged with gypsum crushed to one fourth (¼) inch. The mill is started and steam is admitted to the jacket. Heating time may be decreased by admitting steam directly into the grinding compartment. It is also beneficial to alternately admit steam into and remove it from the grinding compartment. This removes the air from the grinding cylinder. After the gypsum reaches a temperature of 280° F., the steam evolved from the gypsum may be vented from the mill. This steam should not be vented while the temperature of the gypsum is below 250° F. and preferably when it is above 280° F., but not higher than 350° F. When the evolution of steam is nearly complete, the steam vent is closed and the calcined gypsum is ground under low pressure, that is approximately five pounds (5 lbs.) per square inch gage. The grinding should be continued for about one-quarter hour under these conditions. The remainder of the steam is then vented and the mill is discharged. The total time required is less than three hours.

The product resulting from the above operation is a dry, soft, fluffy powder, that has none of the gritty characteristics of crystalline material. It requires an unusually large amount of water to reduce it to pouring consistency, settles slowly when retarded and stirred into excess water, and maintains high plasticity before setting. After setting, it has a smoother surface, higher tensile strength, and lighter color than plaster prepared by processes heretofore known.

The batch process which has been described is applicable to calcined gypsum. The calcined gypsum is charged into the mill, heated to 280° F. by admission of steam into the grinding compartment, after which the process is identical to that used for uncalcined gypsum. When using calcined gypsum of large particle size, it is desirable to do most of the grinding before the mill as vented.

For plasticizing calcined gypsum, I use a jacketed tube mill and process the plaster as a continuous operation. I prefer to use a tube mill of special construction, provided with a jacket for heating the plaster, during grinding, by means of steam or hot oil. The mill should not be provided with peripheral discharge, but should discharge through the trunnion.

This method of construction makes it possible to maintain a larger quantity of material in the mill, and with the same production rate, provides longer time of contact between the plaster and the water vapor with which the free space within the mill is filled, than is possible with peripheral discharge gratings. The discharge end of the mill should also be provided with valves or other restrictions that will prevent the escape of water vapor from the grinding compartment at that end. The feed end of the mill should be provided with a helicoid screw conveyor for transferring the plaster to the grinding compartment. The axial shaft of this conveyor should be bored to provide a passage through which water vapor and air may be removed from the mill.

In operating the mill, I prefer to feed calcined gypsum that is warm but not steaming. This plaster should be slightly undercalcined so that, when heated within the mill, it will evolve some water vapor. Water may be added to the plaster if it is overcalcined. On entering the mill, the plaster is heated and ground simultaneously, causing it to evolve some water vapor. This water vapor escapes through the axial shaft of the helicoid conveyor, and carries with it most of the air which was carried into the mill, entrapped within the interstices of the plaster, thereby keeping it from continued contact with the plaster, particularly in the finishing end of the mill. The temperature at which plasticizing is best accomplished lies in the range 230° F. to 350° F., usually 280° F., and the pressure giving best results is from naught to five pounds per square inch gage.

I claim:

1. The process of preparing plaster of Paris which comprises feeding dry calcined gypsum containing slightly more water than necessary for the formation of calcium sulphate hemi-hydrate into a jacketed tube mill, grinding the gypsum in said mill while maintaining the temperature within the mill between 230° F. and 350° F., by external heating, removing air from the mill by introducing steam therein and maintaining the vapor pressure within the mill at not more than approximately five pounds above atmospheric.

2. The process of preparing plaster of Paris which comprises feeding dry calcined gypsum containing slightly more water than necessary for the formation of calcium hemi-hydrate into a jacketed tube mill, grinding the gypsum in said mill while maintaining the temperature within the mill between 230° F. and 350° F., by external heating, removing air from the mill in the presence of steam, and maintaining the pressure within the mill at not more than approximately five pounds per square inch above atmospheric.

3. The process of preparing plaster of Paris which comprises feeding dry calcined gypsum containing slightly more water than necessary for the formation of calcium hemi-hydrate into a jacketed tube mill, grinding the gypsum in said mill while maintaining the temperature within the mill between 230° F. and 350° F., by external heating, so that steam is generated therein, and maintaining the pressure within the mill at not more than approximately five pounds per square inch above atmospheric.

OLIVER F. REDD.